(12) United States Patent
Porterfield

(10) Patent No.: US 7,318,146 B2
(45) Date of Patent: Jan. 8, 2008

(54) PERIPHERAL DEVICE WITH HARDWARE LINKED LIST

(75) Inventor: A. Kent Porterfield, New Brighton, MN (US)

(73) Assignee: Micron Technology, Inc., Boise, ID (US)

(*) Notice: Subject to any disclaimer, the term of this patent is extended or adjusted under 35 U.S.C. 154(b) by 1189 days.

(21) Appl. No.: 09/884,175

(22) Filed: Jun. 19, 2001

(65) Prior Publication Data
US 2002/0194400 A1 Dec. 19, 2002

(51) Int. Cl.
G06F 9/24 (2006.01)

(52) U.S. Cl. .......... 713/1; 713/2; 713/8; 713/100

(58) Field of Classification Search ........... 713/100, 713/2, 1, 8; 710/2, 8
See application file for complete search history.

(56) References Cited

U.S. PATENT DOCUMENTS

| | | | | |
|---|---|---|---|---|
| 4,580,246 A * | 4/1986 | Sibigtroth | .......... | 365/195 |
| 5,319,778 A * | 6/1994 | Catino | .......... | 707/102 |
| 5,365,587 A * | 11/1994 | Campbell et al. | .......... | 713/183 |
| 5,513,136 A * | 4/1996 | Fandrich et al. | .......... | 365/185.04 |
| 5,546,561 A * | 8/1996 | Kynett et al. | .......... | 711/163 |
| 5,592,641 A * | 1/1997 | Fandrich et al. | .......... | 711/103 |
| 5,764,995 A * | 6/1998 | DeRoo et al. | .......... | 710/200 |
| 5,765,026 A * | 6/1998 | Lin et al. | .......... | 710/30 |
| 5,765,175 A * | 6/1998 | Needham et al. | .......... | 707/206 |
| 5,802,376 A * | 9/1998 | DeRoo et al. | .......... | 710/200 |
| 5,892,964 A * | 4/1999 | Horan et al. | .......... | 712/33 |
| 5,911,051 A * | 6/1999 | Carson et al. | .......... | 710/107 |
| 5,925,134 A * | 7/1999 | Solomon | .......... | 713/324 |
| 5,928,327 A * | 7/1999 | Wang et al. | .......... | 725/88 |
| 5,999,198 A * | 12/1999 | Horan et al. | .......... | 345/531 |
| 6,026,016 A * | 2/2000 | Gafken | .......... | 365/185.04 |
| 6,128,758 A * | 10/2000 | Hall et al. | .......... | 714/727 |
| 6,154,819 A * | 11/2000 | Larsen et al. | .......... | 711/163 |
| 6,167,472 A * | 12/2000 | Mitra et al. | .......... | 710/65 |
| 6,317,803 B1 * | 11/2001 | Rasmussen et al. | .......... | 710/107 |
| 6,430,666 B1 * | 8/2002 | Roth | .......... | 711/202 |
| 6,594,756 B1 * | 7/2003 | Datta et al. | .......... | 713/2 |
| 6,601,120 B1 * | 7/2003 | Schimmel | .......... | 710/107 |
| 6,750,870 B2 * | 6/2004 | Olarig | .......... | 345/531 |
| 2002/0073258 A1 * | 6/2002 | Riley et al. | .......... | 710/105 |
| 2002/0089318 A1 * | 7/2002 | Armstrong et al. | .......... | 323/285 |
| 2003/0093641 A1 * | 5/2003 | Kahn et al. | .......... | 711/170 |

OTHER PUBLICATIONS

PCI Special Interest Group "PCI Bus Power Management", Revision 1.1, Dec. 18, 1998.*

* cited by examiner

Primary Examiner—Thomas Lee
Assistant Examiner—Vincent T Tran
(74) Attorney, Agent, or Firm—Schwegman, Lundberg & Woessner, P.A.

(57) ABSTRACT

A linked list is implemented in hardware. Various registers within the linked list are writeable until a control register is written, rendering the registers read-only. A computer peripheral includes the hardware linked list to provide a list of capabilities to a querying device. The linked list can be built, modified, or disabled by low level software, and then locked so that it appears as read-only to higher level software such as an operating system or device driver.

27 Claims, 6 Drawing Sheets

PERIPHERAL DEVICE WITH HARDWARE LINKED LIST

TECHNICAL FIELD OF THE INVENTION

The present invention relates generally to computer peripheral devices, and in particular, the present invention relates to hardware linked lists in computer peripheral devices.

BACKGROUND OF THE INVENTION

Computers often have peripheral devices connected to them. Some peripheral devices are on cards that are plugged into slots, and other peripheral devices are located on the main circuit board within the computer. This main circuit board, which is typically called a "motherboard," usually has a processor attached.

Some peripheral devices can have one or more predefined capabilities that can be queried by the processor. For example, peripheral devices compliant with revision 2.2 of the peripheral component interconnect (PCI) local bus specification (published Dec. 18, 1998 by PCI Special Interest Group, Portland, Oreg.) may indicate one or more special predefined capabilities using a list of capabilities implemented in hardware and accessible by certain types of software. Examples of defined capabilities include power management, Advanced Graphics Processing (AGP), and PCI-X, which is a variation of PCI. In operation, software such as operating systems and device drivers may query a PCI peripheral device to determine if a particular capability is supported.

Capabilities lists are typically implemented as a set of defined groups of read-only registers. Each group of read-only registers for a given capability contains an address pointer to the next group of capabilities registers, forming what is commonly referred to as a linked list. The linked list is typically physically implemented as a read-only memory (ROM). These linked lists are generated during manufacture of the peripheral device, or during a one-time program operation, typically performed shortly after manufacture. As a result, the linked lists, and associated list of peripheral device capabilities cannot be modified after the peripheral device is resident in a computer system.

For the reasons stated above, and for other reasons stated below which will become apparent to those skilled in the art upon reading and understanding the present specification, there is a need in the art for alternate hardware linked list implementations.

SUMMARY OF THE INVENTION

The above mentioned problems and other problems are addressed by the present invention and will be understood by reading and studying the following specification.

In one embodiment, a peripheral device includes a hardware linked list that has a plurality of nodes. Each node includes a next node pointer register to point to the next node in the linked list. The peripheral device also includes a locking mechanism to conditionally make the next node pointer register of each node read-only.

In another embodiment, an integrated circuit includes a first writeable register to signify whether a capabilities list is enabled, and a second writeable register to point to a capabilities list. The integrated circuit also includes a write-once control register operable to make the first and second writeable registers read-only. The capabilities list can be a hardware linked list pointed to by the second writeable register. The hardware linked list includes a plurality of nodes, and each of the plurality of nodes includes a writeable next node register to point to the next node in the linked list. The writeable next node registers become read-only when the control register is written.

In another embodiment, a method of initializing a computer peripheral includes writing a list of capabilities to nodes in a hardware linked list within the computer peripheral and writing to a control register within the computer peripheral to make the nodes read-only. The nodes each include a capability register and a next node pointer register, and the next node pointer registers are modified when writing the list of capabilities.

DETAILED DESCRIPTION OF THE INVENTION

Figure 1:
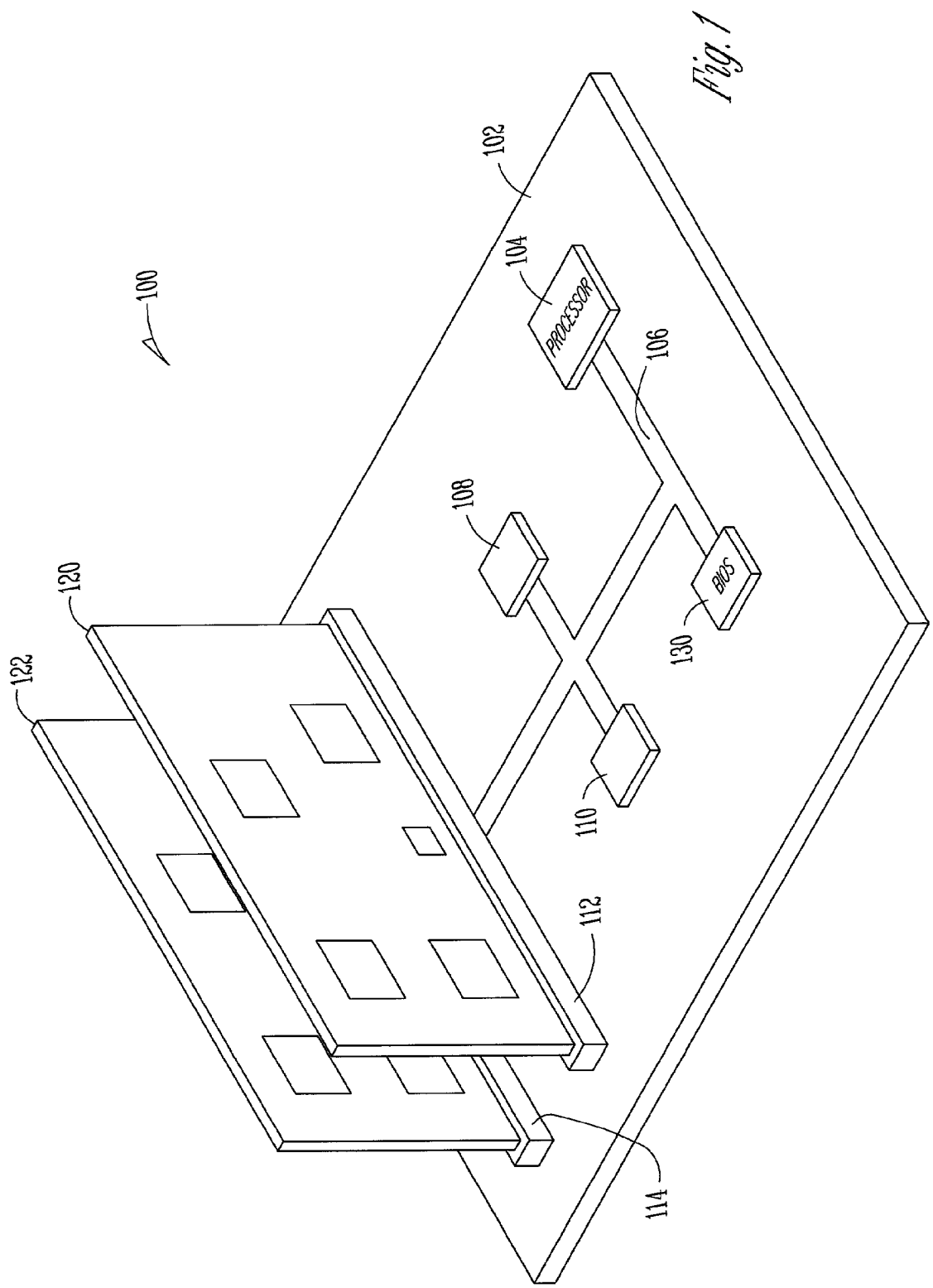
FIG. 1 is a perspective view of a computer system.

In the following detailed description of the invention, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims, along with the full scope of equivalents to which such claims are entitled.

FIG. 1 is a perspective view of a computer system. Computer system 100 includes motherboard 102, processor 104, basic input/output software (BIOS) 130, and peripherals 108, 110, 120 and 122. Processor 104, BIOS 130, and peripherals 108 and 110 reside directly on motherboard 102. Peripherals 120 and 122 in contrast, are add-in cards accepted by connectors 112 and 114 mounted to motherboard 102. Processor 104, BIOS 130, and peripherals 108, 110, 120, and 122 are coupled together by bus 106.

Processor 104 can be any type of processor. For example, in some embodiments processor 104 is a microprocessor. Also for example, in some embodiments processor 104 is a digital signal processor or a microcontroller. BIOS 130 is a memory device that includes instructions for initialization of computer system 100, and also includes instructions for low-level software routines. For example, when power is applied to computer system 100, processor 104 reads initialization instructions from BIOS 130 and performs various initialization tasks. Initialization tasks performed by processor 104 include internal initialization of processor 104 and initialization of peripherals, such as peripherals 108, 110, 120, and 122. Processor 104 communicates with BIOS 130 and various peripherals using bus 106. In some embodiments, bus 106 is a communications bus that adheres to a standard protocol, such as PCI local bus specification, revision 2.2.

Initialization tasks performed by processor 104 include initialization of peripherals such as peripherals 108, 110, 120, and 122. For example, a capabilities list held within peripherals can be initialized by processor 104. Example embodiments of hardware linked lists useful for defining lists of peripherals capabilities are explained with reference to the figures that follow.

Figure 2:
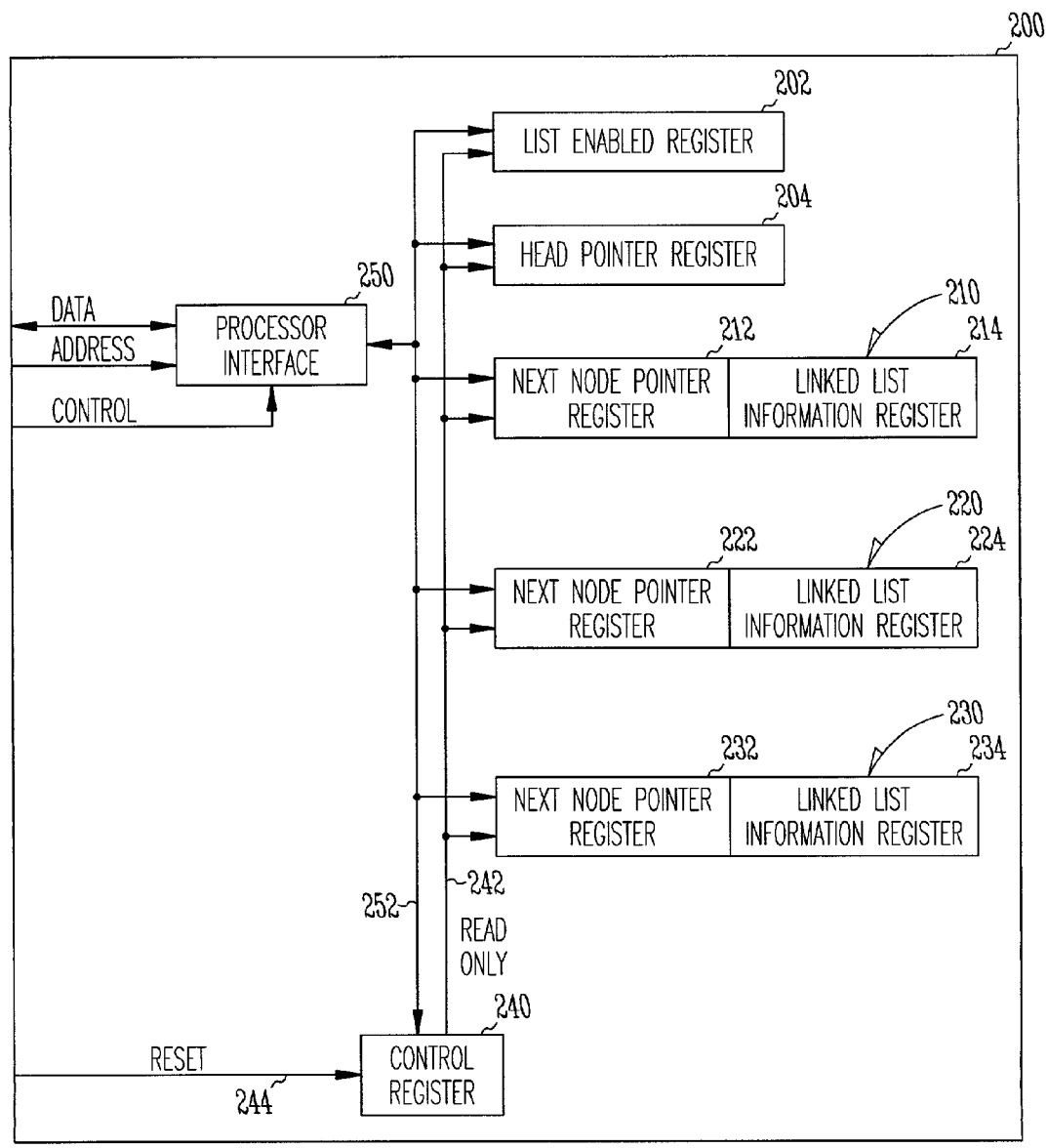
FIG. 2 is a diagram of an integrated circuit with a hardware linked list.

FIG. 2 is a diagram of an integrated circuit with a hardware linked list. Integrated circuit 200 is an integrated circuit that includes a linked list in hardware. Integrated circuit 200 can be any integrated circuit that benefits from a hardware linked list. For example, in some embodiments, peripheral devices 108 and 110 (FIG. 1) include the linked list circuitry shown in integrated circuit 200. Also for example, peripherals 120 and 122 (FIG. 1) can include integrated circuits such as integrated circuit 200.

Integrated circuit 200 includes processor interface 250, control register 240, list enabled register 202, head pointer register 204, and list nodes 210, 220, and 230. Each of list nodes 210, 220, and 230 include a next node pointer register and one or more linked list information registers. For example, list nodes 210, 220, and 230 include next node pointer registers 212, 222, and 232, and also include linked list information registers 214, 224, and 234, respectively. In general, list nodes are groups of registers and each next node pointer register points to the next group.

List nodes within integrated circuit 200 can be logically chained to create a linked list in hardware. For example, each next node pointer register can include the address of a list node, thereby providing a logical chain between list nodes. Logical chaining of list nodes is shown in more detail in the figures below.

Linked list information registers include information useful to integrated circuit 200. In some embodiments, linked list information registers include information regarding capabilities of integrated circuit 200. When a linked list is created by logically chained list nodes, each linked list information register includes a subset of the information held by the entire linked list. Three list nodes are shown in FIG. 2. In some embodiments, many more than three list nodes exist. In other embodiments, only one linked list node exists. In the examples that follow, three list nodes are used repeatedly for clarity, and for ease of comparison between the various figures.

Head pointer register 204 is a register within integrated circuit 200 that provides a starting address for the hardware linked list. For example, head pointer register 204 can include the address of any of the list nodes 210, 220, or 230. Head pointer register 204 is said to "point" to the list node corresponding to the address held in head pointer register 204. List enabled register 202 is a register within integrated circuit 200 that holds information regarding the validity of the hardware linked list. In some embodiments, list enabled register 202 is a single bit in a larger status register. In other embodiments, list enabled register is a stand alone register with a dedicated address.

In embodiments represented by FIG. 2, processor interface 250 communicates with a bus that includes data, address, and control. For example, processor interface 250 can be coupled to a bus such as bus 106 (FIG. 1). One skilled in the art will understand that many different types of busses exist, and a processor interface 250 can be readily made to communicate with any type of bus. Processor interface 250 allows other integrated circuits, such as a processor, to communicate with the various registers shown in FIG. 2. Each of the registers shown in integrated circuit 200 have a memory mapped address associated therewith, and processor interface 250 provides a mechanism for the various registers within integrated circuit 200 to be accessed at their respective addresses. For example, using internal node 252, processor interface 250 can write to, and read from, list enabled register 202, head pointer register 204, and the various registers within list nodes 210, 220, and 230. Processor interface 250 can also write to and read from control register 240 using internal node 252. Internal node 252 is shown in FIG. 2 as a single line, but in many embodiments, internal node 252 includes many physical lines for decoding and data transfer.

Control register 240 receives a system reset on node 244, and produces a "read-only" signal on node 242. When power is applied to integrated circuit 200, or when a hardware reset is asserted, reset signal on node 244 is asserted to control register 240. Control register 240, in turn, de-asserts the read-only signal on node 242. When the read-only signal on node 242 is de-asserted, the various registers within integrated circuit 200 are not read-only. For example, when the read-only signal on node 242 is de-asserted, processor interface 250 can read and write to list enabled register 202, head pointer register 204, and the various registers of list nodes 210, 220, and 230.

Control register 240 can also assert the read-only signal on node 242, thereby removing the ability to write to the various registers of integrated circuit 200. In some embodiments, when control register 240 is written to by processor interface 250, the read-only signal on node 242 is asserted. Subsequent to the read-only signal being asserted on node 242, the various registers within integrated circuit 200 are no longer writeable, but instead are read-only. In some embodiments, control register 240, once written to, cannot be written to again prior to a reset signal being asserted on node 244.

In operation, after a system reset is asserted on node 244, various registers within integrated circuit 200 are writeable. In some embodiments, a linked list can be created by writing to the various registers within integrated circuit 200. For example, list enabled register 202 can be modified to indicate that a linked list is enabled within integrated circuit 200, and head pointer register 204 can be modified to include the memory mapped address of any of list nodes 210, 220, and 230. Furthermore, each next node pointer register can be modified in the same manner as head pointer register 204 to point to subsequent list nodes.

In some embodiments, in addition to head pointer register 204 and the next node pointer registers being modified, the linked list information registers can also be modified. For example, list nodes intended to be included within the hardware linked list can have various information written thereto, allowing the hardware linked list to provide various types of information. Once the hardware linked list is created by modifying registers as previously described, control register 240 can be written to, thereby asserting the read-only signal on node 242 rendering the various registers within integrated circuit 200 read-only.

The sequence just described can be useful to allow initialization software to create a linked list within integrated circuit 200, and then lock the list such that it cannot be modified prior to a subsequent system reset. For example, referring now back to FIG. 1, BIOS 130 can include processor instructions for initialization of peripherals 108, 110, 120, and 122. Each of these peripherals can include the circuitry represented in FIG. 2, and processor 104 can generate a linked list by modifying the various register values prior to writing to the control register.

As previously described, control register 240 provides a read-only signal on node 242 to registers internal to integrated circuit 200. In other embodiments, a read-only signal is provided to registers using mechanisms other than control register 240. For example, a read-only signal can be brought in from a pin on integrated circuit 200, thereby allowing an external signal to control the read-only capability of the various registers within integrated circuit 200.

The circuitry shown in FIG. 2 is useful in any integrated circuit that can benefit from a writeable hardware linked list that can be made read-only. For example, in a PCI local bus compliant peripheral, a capabilities linked list can be generated by low-level software and made read-only to high-level software. Examples of such embodiments are shown in the figures that follow.

Figure 3A:
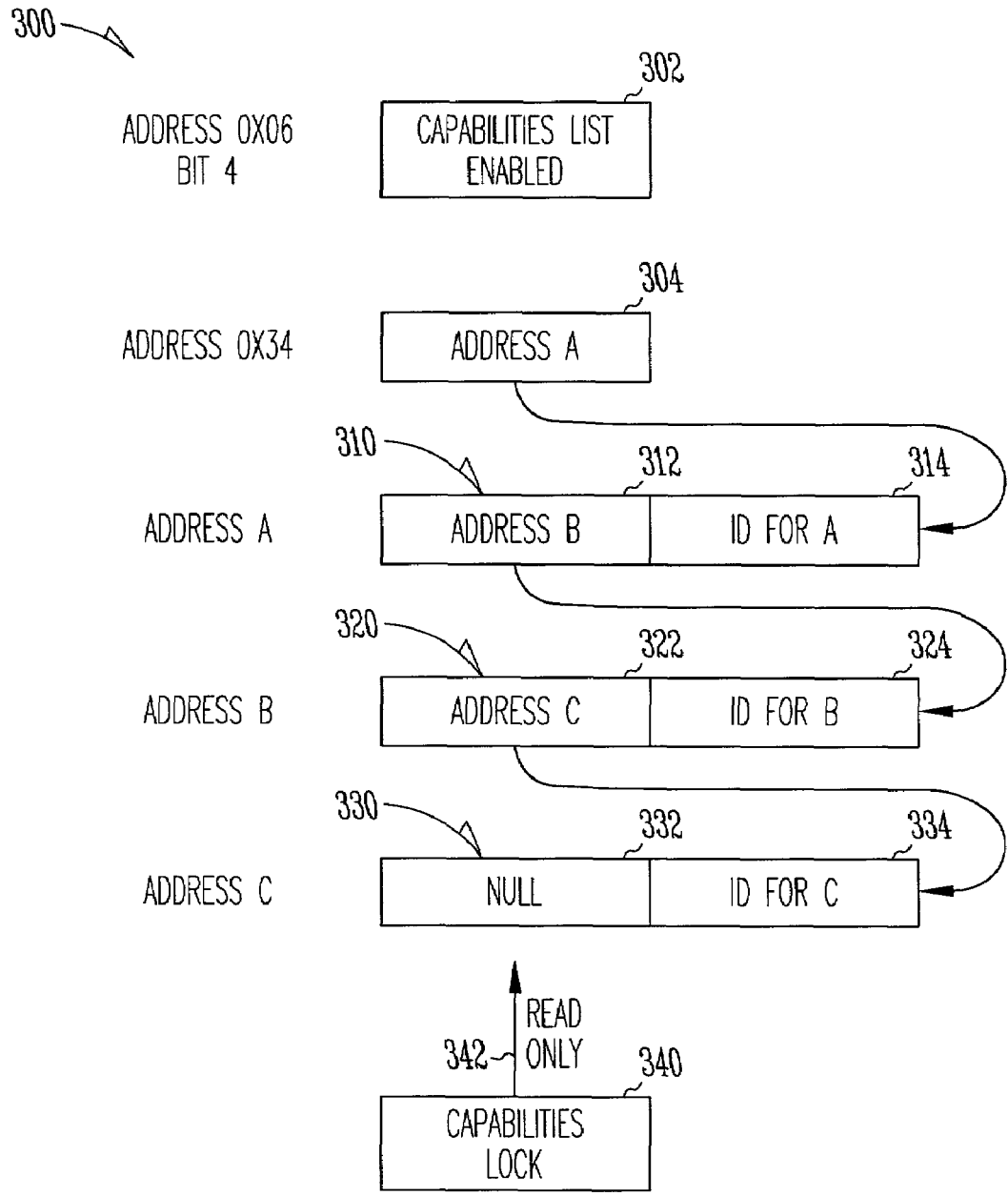
FIGS. 3A, 3B, and 4 are diagrams of capabilities linked lists.

FIG. 3A shows a PCI local bus compliant capabilities list 300. Capabilities list 300 includes capabilities list enabled register 302, capabilities pointer register 304, capabilities lock register 340, and capabilities list nodes 310, 320, and 330. Capabilities list enabled register 302 corresponds to list enabled register 202 (FIG. 2). Likewise, capabilities pointer register 304 corresponds to head pointer register 204 (FIG. 2). In a similar manner, list nodes 310, 320, and 330 correspond to list nodes shown in FIG. 2. Each list node includes a capability register and a next capability register. For example, list node 310 includes capability register 314 and next capability register 312.

Linked list 300 is shown in FIG. 3A having already been programmed. For example, capabilities pointer register 304 includes address A, which is the memory mapped address of linked list node 310. Similarly, the next capabilities registers of list nodes 310 and 320 hold addresses B and C, which correspond to memory mapped addresses of list nodes that logically follow. List node 330 is at the end of linked list 300, and the next capability register 332 holds a null value, representing the end of the linked list. Linked list 300 also includes capabilities lock register 340. Capabilities lock register 340 corresponds to control register 240 (FIG. 2). When capabilities lock register 340 is written to, the read-only signal on node 342 is asserted, thereby making the various registers in linked list 300 read-only.

Linked list 300 includes three linked list nodes representing capabilities A, B, and C. When linked list 300 is traversed, capability registers 314, 324, and 334 will be found within linked list 300, corresponding to capabilities A, B, and C. For example, referring now back to FIG. 1, when linked list 300 is included in a peripheral such as peripheral 108, processor 104 can query the peripheral to ascertain capabilities by traversing linked list 300.

Figure 3B:
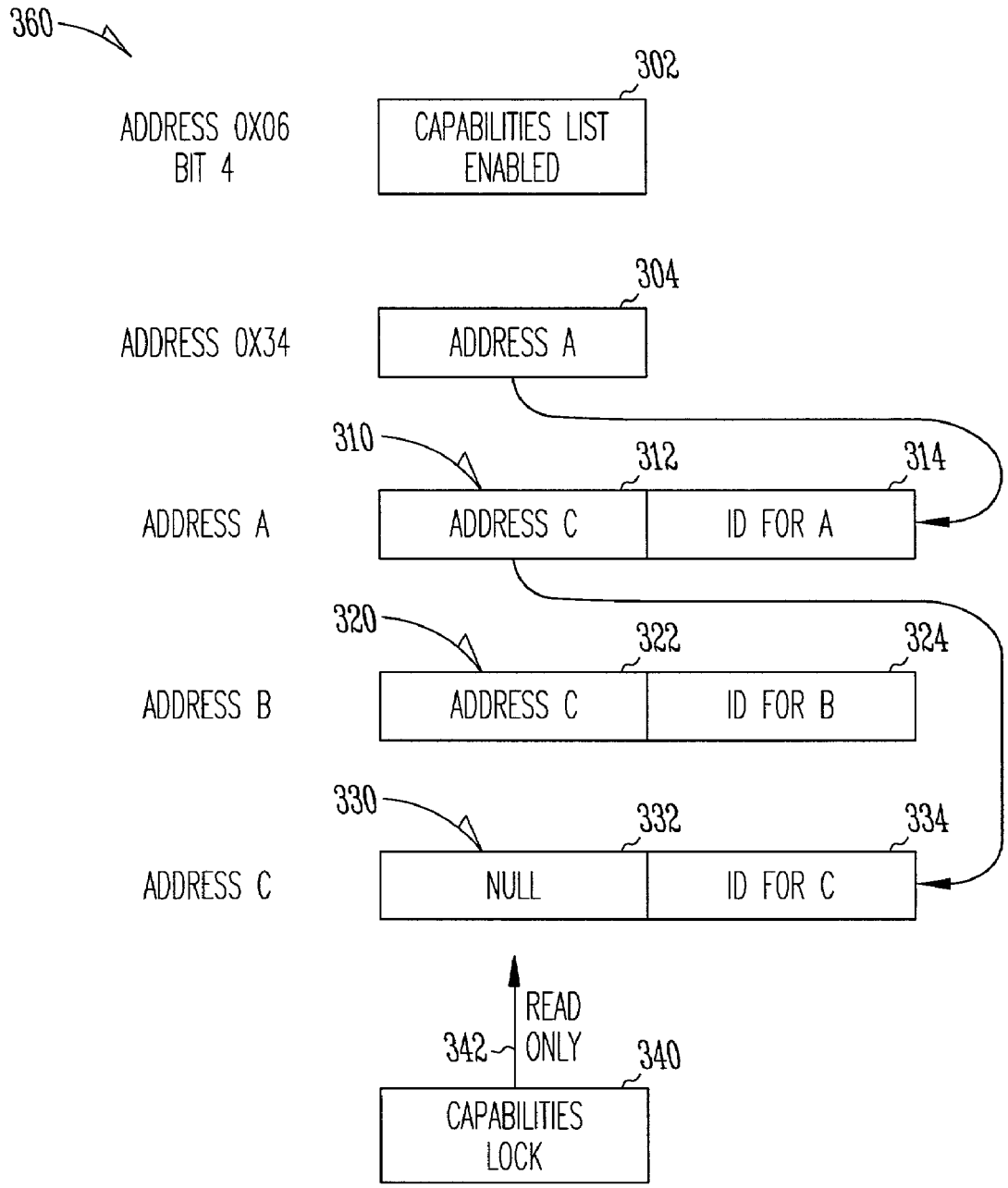

FIG. 3B shows a hardware linked list utilizing the same list nodes as FIG. 3A, but having a different logically linked list. Linked list 360 includes capabilities list enabled register 302, capabilities pointer register 304, capabilities lock register 340, and list nodes 310 and 330. Prior to read-only signal on node 342 being asserted, the various registers in linked list 360 were programmed to include list nodes 310 and 330, and exclude list node 320. When linked list 360 is traversed, only list nodes corresponding to capabilities A and C will be found. After capabilities lock register 340 is written to, linked list 360 will be read-only, and list node 320 will not be found.

FIGS. 3A and 3B show two of many possible embodiments that can be generated by modifying registers within the linked list. As shown in FIGS. 3A and 3B, possible capabilities include A, B, and C. In the embodiment of FIG. 3A, all three capabilities are included in the linked list in the order A, B, and C. In the embodiment of FIG. 3B, only capabilities A and C are included. Any number of list nodes can be included in a linked list. For example, in one embodiment, only list node 320 is included, and in another embodiment only list node 310 is included. Furthermore, list nodes can be included in any order. For example, capabilities pointer 304 can hold the memory mapped address of any list node included within the linked list. Additionally, any next capability register can include the memory mapped address of any list node desired.

In some embodiments, list nodes with predefined capabilities registers exist within peripheral devices prior to power being applied. For example, a peripheral device that includes list nodes 310, 320, and 330 can have capabilities registers 314, 324, and 334 preprogrammed with capabilities identifiers for capabilities A, B, and C, respectively. Low-level software then builds a linked list by simply modifying the list head pointer and next capability pointers. In other embodiments, capabilities identifiers are not preprogrammed within list nodes, and linked lists can be built by modifying capabilities registers and pointer registers.

Figure 4:
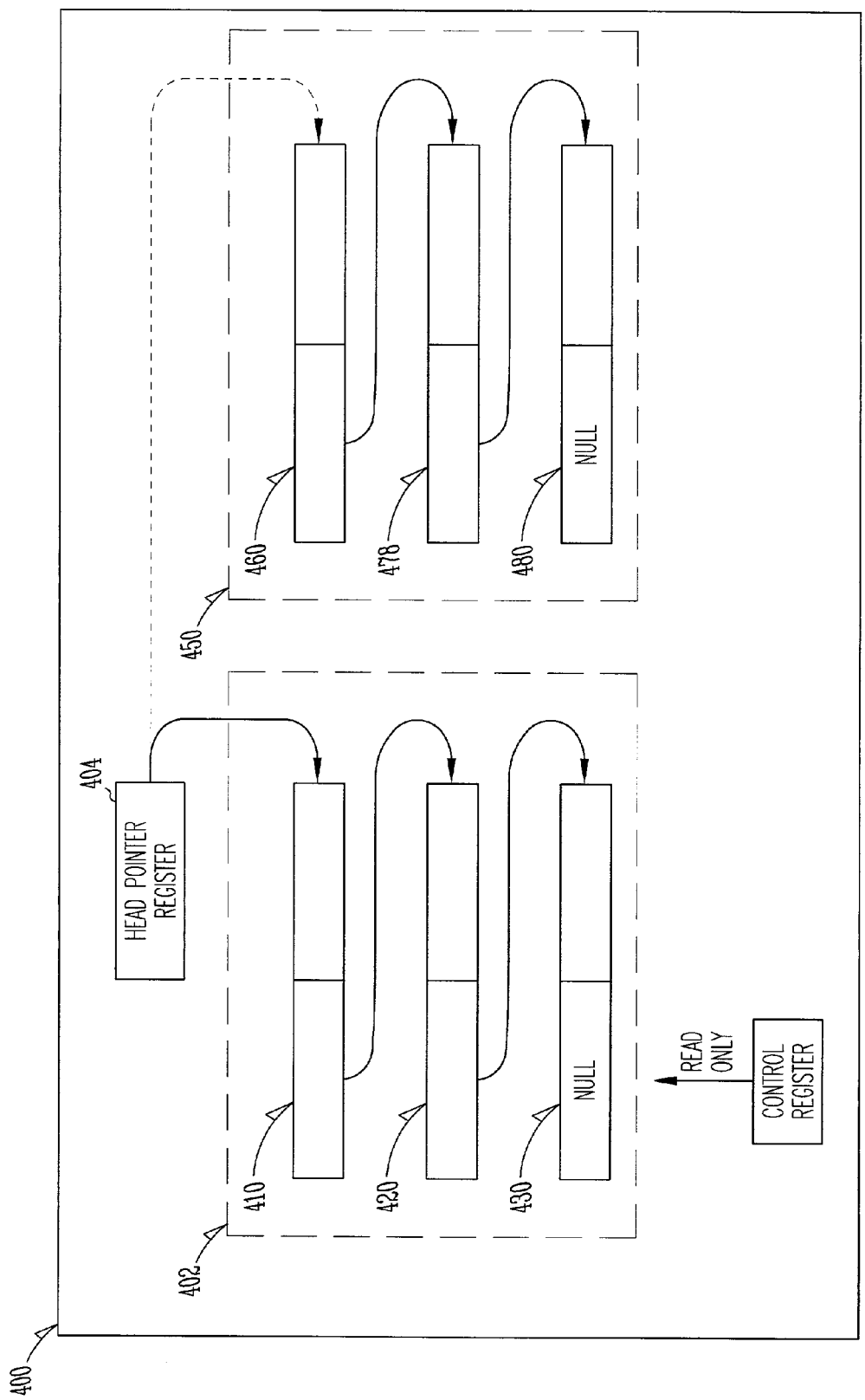

FIG. 4 shows another embodiment of a hardware linked list in an integrated circuit. Integrated circuit 400 includes head pointer register 404 and list node groups 402 and 450. List node group 402 includes list nodes 410, 420, and 430, and list node group 450 includes list nodes 460, 478, and 480. In the embodiment shown in FIG. 4, head pointer register 404 can be modified to select one of two groups of list nodes. Head pointer register 404 is shown pointing to the linked list that includes group 402. A dashed line is shown from head pointer register 404 to list node 460 to signify the capability of changing head pointer register 404 to point to list node 460. Once head pointer register 404 is modified to point to either group 402 or 450, control register 490 is written to render all registers read-only, as in the previously described embodiments.

Figure 5:
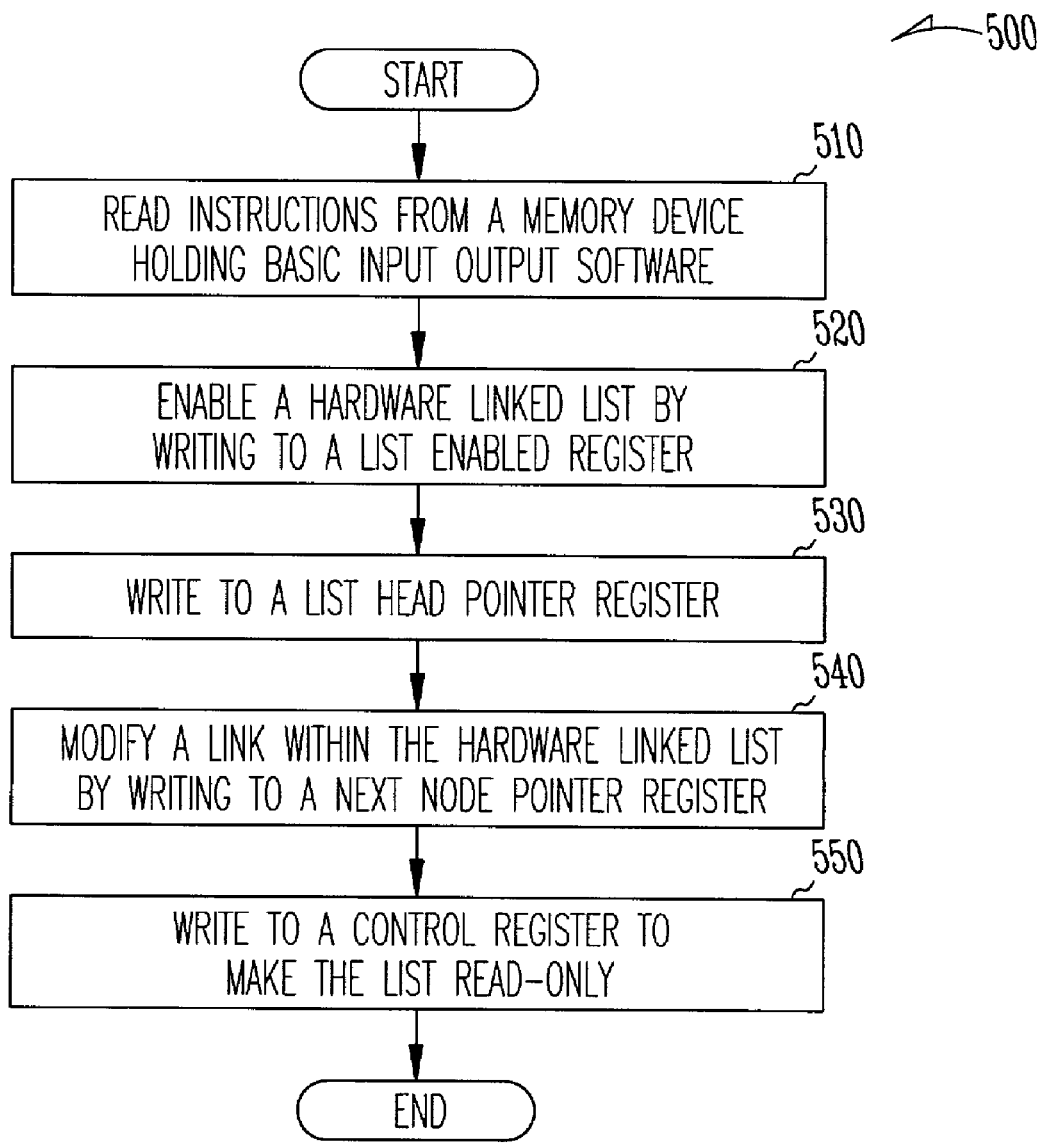
FIG. 5 is a flowchart of a method of initializing a computer peripheral.

FIG. 5 shows a flowchart of a method for initializing a peripheral. Method 500 begins at 510 where instructions are read from a memory device that holds basic input/output software. For example, processor 104 (FIG. 1) can read initialization instructions from BIOS 130 (FIG. 1). At 520, a hardware linked list is enabled by writing to a list enabled register. This corresponds to processor 104 writing to a list enabled register such as register 202 (FIG. 2), or register 302 (FIG. 3A). At 530, a list head pointer register is written. This corresponds to a head pointer register such as register 204 (FIG. 2) or register 304 (FIG. 3A). At 540, a link within the hardware linked list is modified by writing a next node pointer register. The next node pointer register of method 500 corresponds to next capability registers 312, 322, and 332 of FIGS. 3A and 3B, and also corresponds to next node pointer registers 212, 222, and 232 of FIG. 2. By writing to next node pointer registers, links within the hardware linked list are modified to either include or exclude list nodes within the hardware linked list. At 550, a control register is written to render the list read-only.

One skilled in the art will understand that many embodiments exist and that specific examples have been described. For example, in some embodiments only pointer registers are writeable and capabilities registers are always read-only. In other embodiments, pointer registers and capabilities registers are writeable prior to a write to a control register which renders them all read-only. Any combination of writeable registers and read-only registers can be included without departing from the scope of the present invention.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A PCI local bus compliant device comprising:
   a hardware implemented capabilities list capable of being modified by low-level software, and read-only to higher level software, wherein a modification to the capabilities list by the low-level software modifies capabilities available from the PCI local bus compliant device, wherein the hardware implemented capabilities list comprises a plurality of list nodes that each include a writeable next node pointer register; and
   a control register coupled to the writeable next node pointer registers the control register being operable to change the writeable next node pointer registers to read-only next node pointer registers.

2. The PCI local bus compliant device of claim 1 wherein the hardware implemented capabilities list is writeable by basic input output software and read-only to operating system software.

3. The PCI local bus compliant device of claim 1 wherein the PCI local bus compliant device comprises an integrated circuit that includes the hardware implemented capabilities list.

4. An integrated circuit comprising:
   an address bus;
   a data bus;
   a control bus;
   a series of linked list registers coupled to the address, data, and control busses, the series of linked list registers arranged in a writeable linked list;
   a control register operable to lock the writeable linked list and conditionally make the series of linked list registers read-only;
   wherein the control register is writeable only by a first level of software and the series of linked list registers are accessible by a second level of software; and
   wherein the series of linked list registers are arranged in groups, each group forming a linked list node, each linked list node including one next node pointer register.

5. The integrated circuit of claim 4 wherein the control register is operable to make the next node pointer register of each linked list node read-only.

6. An integrated circuit comprising:
   an address bus;
   a data bus;
   a control bus;
   a series of linked list registers coupled to the address, data, and control busses, the series of linked list registers arranged in a writeable linked list, wherein the series of link list registers include data representative of one or more capabilities of a PCI compliant computer peripheral; and
   a control register operable to lock the writeable linked list and conditionally make the series of linked list registers read-only, wherein the integrated circuit comprises a PCI local bus compliant computer peripheral.

7. The integrated circuit of claim 6 wherein the control register is accessible by a first level of software and the series of linked list registers are accessible by a second level of software.

8. An integrated circuit comprising:
   a plurality of register groups, each register group including registers operable to indicate capabilities of the integrated circuit, and including a next group register to point to a next group, wherein the register groups can be written to modify one or more capabilities of the integrated circuit; and
   a control register operable to render the plurality of register groups read-only,
   wherein the control register comprises a write-once lock bit, that when written, renders the plurality of register groups read-only and the write-once lock bit is configured such that the write-once lock bit can be written to only once between hardware reset sequences.

9. The integrated circuit of claim 8 wherein the plurality of register groups form a PCI local bus compliant capabilities list.

10. The integrated circuit of claim 8 wherein the control register is modifiable once by basic input output software, and is not modifiable by operating system software.

11. A computer system comprising:
    a PCI local bus compliant peripheral device coupled to a bus; and
    a processor coupled to the bus;
    wherein the PCI local bus compliant peripheral device includes a capabilities linked list modifiable by the processor, and wherein the PCI local bus compliant peripheral device further includes a writeable control register operable to render the capabilities linked list read-only by the processor; and
    wherein the capabilities linked list comprises a plurality of nodes made up of groups of registers, each node corresponding to one capability and including one writeable next node pointer register.

12. The computer system of claim 11 wherein the writeable control register is operable to render the writeable next node pointer registers read-only.

13. The computer system of claim 11 further including a memory device having processor instructions stored therein, the processor instructions being operable to cause the processor to write to the writeable control register.

14. The computer system of claim 11 wherein the PCI local bus compliant peripheral device includes a writeable register to indicate whether the capabilities linked list is enabled.

15. A method of initializing a computer peripheral comprising:
    writing a list of capabilities to nodes in a hardware linked list within the computer peripheral during initialization of the computer peripheral; and
    writing to a control register within the computer peripheral to make the nodes read-only.

16. The method of claim 15 wherein the nodes each include a capability register and a next node pointer register, and writing a list of capabilities comprises modifying the next node pointer register.

17. The method of claim 15 wherein writing to a control register comprises writing once to a capabilities lock bit, which thereafter is read-only.

18. The method of claim 15 further comprising writing to a capabilities list enabled register to signify whether the list of capabilities is enabled.

19. The method of claim 15 wherein the method is performed by basic input output software prior to loading of an operating system.

20. A method of initializing a PCI local bus compliant device comprising:
   reading instructions from a memory device holding basic input output software;
   modifying a link within a capabilities linked list in the PCI local bus compliant device; and
   writing to a control register in the PCI local bus compliant device to make the link read-only.

21. The method of claim 20 wherein the capabilities linked list comprises a plurality of nodes, each node including a capabilities register and a next node pointer register, and wherein modifying a link comprises writing to the next node pointer register.

22. The method of claim 20 further comprising writing to a capabilities list enabled register.

23. The method of claim 20 further comprising writing to a head pointer register.

24. An apparatus having a computer readable medium with machine-readable instructions for a method stored thereon, the method comprising:
   modifying a next node pointer register in a PCI local bus peripheral to indicate the existence of a capability; and
   modifying a control register in the PCI local bus peripheral to make the next node pointer register read-only.

25. The apparatus of claim 24 wherein the method further comprises modifying a head pointer register to point to a hardware capabilities linked list, wherein the head pointer register becomes read-only responsive to the control register.

26. The apparatus of claim 24 wherein the apparatus comprises a read-only memory.

27. The apparatus of claim 24 wherein the method further comprises modifying a capabilities list enabled register, wherein the capabilities list enabled register becomes read-only responsive to the control register.

* * * * *